United States Patent
Onuki

(10) Patent No.: US 10,885,319 B2
(45) Date of Patent: Jan. 5, 2021

(54) POSTURE CONTROL SYSTEM

(71) Applicant: Sony Interactive Entertainment Inc., Tokyo (JP)

(72) Inventor: Yoshikazu Onuki, Yokohama (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 149 days.

(21) Appl. No.: 16/151,631

(22) Filed: Oct. 4, 2018

(65) Prior Publication Data

US 2019/0130177 A1    May 2, 2019

(30) Foreign Application Priority Data

Oct. 31, 2017 (JP) ................. 2017-210140

(51) Int. Cl.
- *G06K 9/00* (2006.01)
- *G06F 3/01* (2006.01)
- *G06T 7/215* (2017.01)

(52) U.S. Cl.
CPC ......... *G06K 9/00342* (2013.01); *G06F 3/012* (2013.01); *G06F 3/013* (2013.01); *G06K 9/00228* (2013.01); *G06K 9/00335* (2013.01); *G06T 7/215* (2017.01)

(58) Field of Classification Search
CPC .......... G06K 9/00342; G06K 9/00335; G06K 9/00228; G06F 3/013; G06F 3/012; G06F 3/011; G06F 3/0304; G06T 7/215; G06T 2207/10016; G06T 2207/30204; G06T 2207/30201; G06T 7/246; G06T 7/73

USPC ....... 382/100, 103, 106, 107, 108, 115, 117, 382/118, 128, 151, 154, 181, 190, 189, 382/214, 216, 285, 293, 296, 305; 345/633

See application file for complete search history.

(56) References Cited

U.S. PATENT DOCUMENTS

| | | | |
|---|---|---|---|
| 10,019,828 B2* | 7/2018 | Hayashida | A63F 13/58 |
| 10,416,758 B2* | 9/2019 | Tsuchie | G06F 3/01 |
| 10,430,985 B2* | 10/2019 | Harrises | G02B 27/0172 |
| 2016/0300390 A1* | 10/2016 | Malafeew | A63F 13/245 |

* cited by examiner

*Primary Examiner* — Sheela C Chawan
(74) *Attorney, Agent, or Firm* — Katten Muchin Rosenman LLP

(57) ABSTRACT

Disclosed herein is a posture control system containing a posture control unit that changes a direction of a user's body and a display unit mounted on a user's head. The posture control system includes: a posture data acquiring unit configured to acquire posture data indicating the direction of the user's body; a motion sensor data acquiring unit configured to acquire motion sensor data indicating a direction of a user's face in a real space which is detected by a motion sensor; a camera image data acquiring unit configured to acquire camera image data indicating the face direction with reference to the direction of the user's body which is specified based on a camera image; and a face direction specifying unit configured to specify the direction of the user's face based on the posture data, the motion sensor data, and the camera image data.

8 Claims, 4 Drawing Sheets

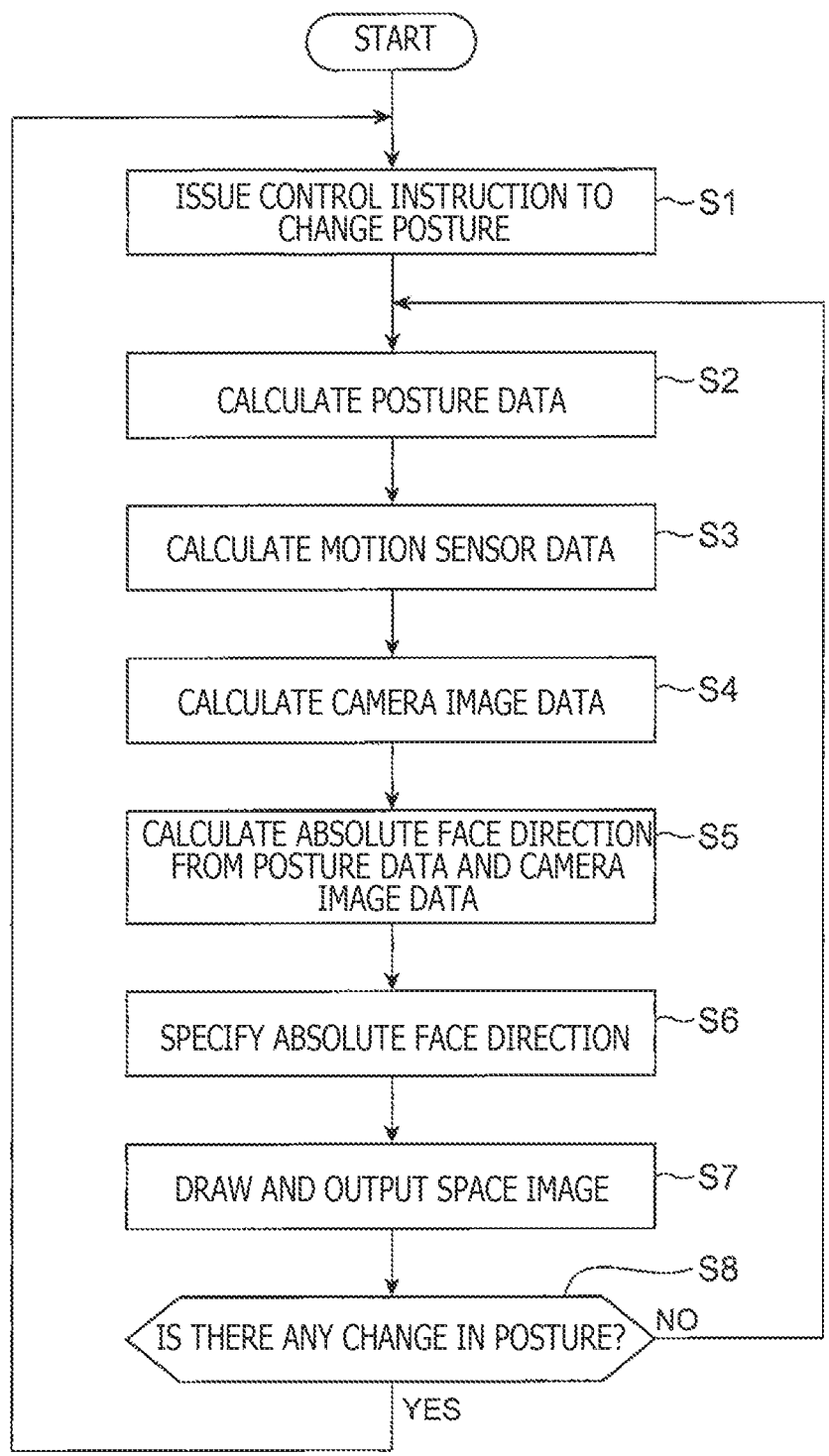

POSTURE CONTROL SYSTEM

BACKGROUND

The present disclosure relates to a posture control system to control a user's posture, an information processing system as a constituent of the posture control system, an information processing method, and a program.

There has recently emerged a research in new technologies such as augmented reality and virtual reality. They include one which displays scenes in a virtual space so that the user wearing a display unit of head-mounted type feels as if he/she were actually in a virtual space. It sometimes needs to change the user's body direction (simply referred to as posture hereinafter) so as to make the user feel more strongly as if he were in a virtual space or so as to reduce the user's sense of discomfort due to discrepancy between the real space and the virtual space. Specifically, there exists an apparatus to control user's posture by fastening the user to a seat and rotating the seat. This posture control apparatus permits the user to experience the change of his posture such as the direction of his face actually changes in the virtual space.

SUMMARY

According to the existing technique mentioned above, the posture control apparatus changes the user's posture so that the video displayed on the display unit changes as the user's posture changes. However, the user fixed in the seat of the posture control apparatus is able to move his head to change the direction of his face. It is desirable in this case that the image displayed on the display unit changes as the direction of the user's face changes. Therefore, it is necessary for the posture control apparatus to accurately specify the direction of the user's face while it is performing posture control.

The present disclosure has been completed in view of the foregoing. It is desirable to provide a posture control system, an information processing method, and a program, the posture control system being able to accurately specify the direction of the user's face while it is performing posture control.

A posture control system according to an embodiment of the present disclosure is one containing a posture control unit that changes a direction of a user's body and a display unit to be mounted on a user's head. The posture control system includes a posture data acquiring unit, a motion sensor data acquiring unit, a camera image data acquiring unit, and a face direction specifying unit. The posture data acquiring unit acquires posture data indicating the direction of the user's body which varies by the posture control unit. The motion sensor data acquiring unit acquires motion sensor data indicating a direction of a user's face in a real space which is detected by a motion sensor built in the display unit. The camera image data acquiring unit acquires camera image data indicating the face direction with reference to the direction of the user's body which is specified based on a camera image taken by a camera which changes in shooting direction as the direction of the user's body changes. The face direction specifying unit specifies the direction of the user's face based on the posture data, the motion sensor data, and the camera image data.

An information processing apparatus according to another embodiment of the present disclosure is one to be connected to a posture control unit that changes a direction of a user's body and to a display unit mounted on a user's head. The information processing apparatus includes a posture data acquiring unit, a motion sensor data acquiring unit, a camera image data acquiring unit, and a face direction specifying unit. The posture data acquiring unit acquires posture data indicating the direction of the user's body which varies by the posture control unit. The motion sensor data acquiring unit acquires motion sensor data indicating a direction of a user's face in a real space which is detected by a motion sensor built in the display unit. The camera image data acquiring unit acquires camera image data indicating the face direction with reference to the direction of the user's body which is specified based on a camera image taken by a camera which changes in shooting direction as the direction of the user's body changes. The face direction specifying unit specifies the direction of the user's face based on the posture data, the motion sensor data, and the camera image data.

An information processing method according to another embodiment of the present disclosure includes acquiring posture data indicating a direction of a user's body which varies by a posture control unit that changes the direction of the user's body, acquiring motion sensor data indicating a direction of a user's face in a real space which is detected by a motion sensor built in a display unit to be mounted on a user's head, acquiring camera image data indicating the face direction with reference to the direction of the user's body which is specified based on a camera image taken by a camera which changes in shooting direction as the direction of the user's body changes, and specifying the direction of the user's face based on the posture data, the motion sensor data, and the camera image data.

A program according to another embodiment of the present disclosure is one for a computer connected to a posture control unit to change a direction of a user's body and a display unit mounted on a user's head. The program includes by a posture data acquiring unit, acquiring posture data indicating the direction of the user's body which varies by the posture control unit, by a motion sensor data acquiring unit, acquiring motion sensor data indicating a direction of a user's face in a real space which is detected by a motion sensor built in the display unit, by a camera image data acquiring unit, acquiring camera image data indicating the face direction with reference to the direction of the user's body which is specified based on a camera image taken by a camera which changes in shooting direction as the direction of the user's body changes, and by a face direction specifying unit, specifying the direction of the user's face based on the posture data, the motion sensor data, and the camera image data.

BRIEF DESCRIPTION OF THE DRAWINGS

FIG. 4 is a flow diagram depicting a flow executed by the information processing apparatus pertaining to the embodiment of the present disclosure.

DETAILED DESCRIPTION OF THE PREFERRED EMBODIMENTS

In what follows, embodiments of the present disclosure will be described in more detail with reference to the accompanying drawings.

Figure 1:
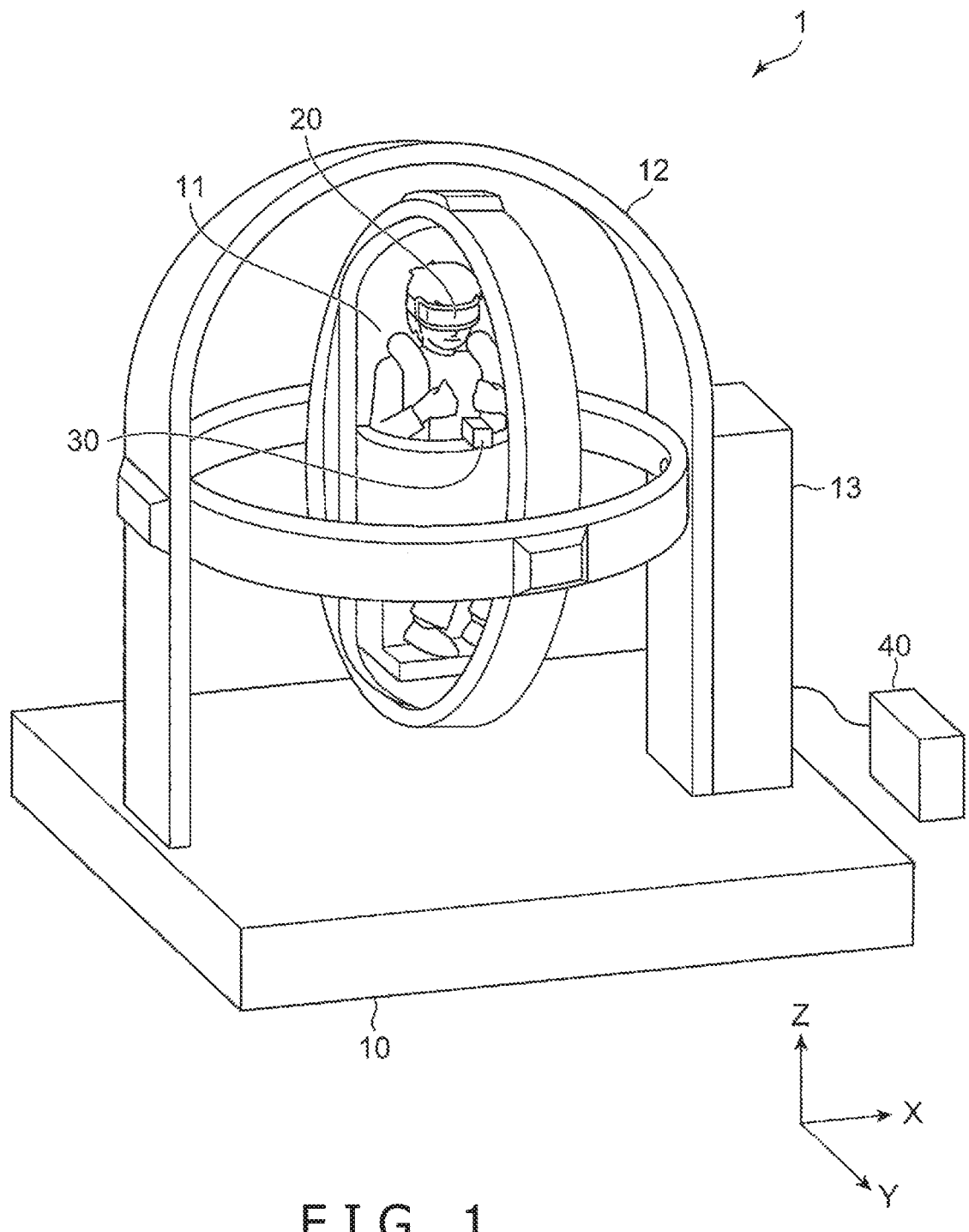
FIG. 1 is a schematic diagram depicting a posture control system pertaining to an embodiment of the present disclosure.
Figure 2:
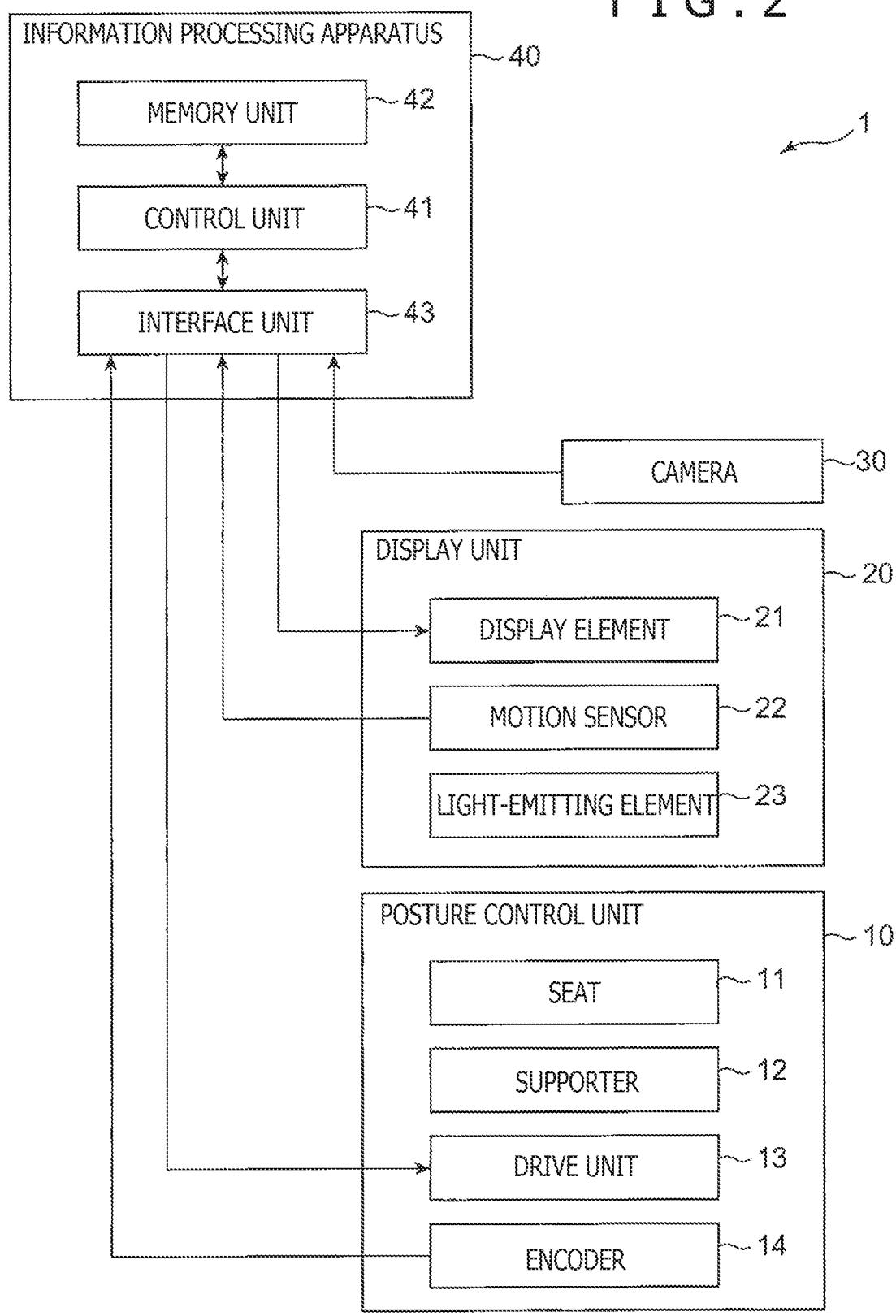
FIG. 2 is a diagram depicting a constitution of the posture control system pertaining to the embodiment of the present disclosure.

FIG. 1 is a schematic diagram depicting a posture control system 1 under user's control pertaining to one embodiment of the present disclosure. FIG. 2 is a diagram depicting a constitution of the posture control system 1. It is noted from these figures that the posture control system 1 includes a posture control unit 10, a display unit 2 of head-mounted type, a camera 30, and an information processing apparatus 40.

The posture control unit 10 is intended to change the direction of the user's body. As depicted in FIGS. 1 and 2, it includes a seat 11, a supporter 12, a drive unit 13, and an encoder 14.

The user sits on the seat 11 so that his body is fastened. The seat 11 is supported by the supporter 12, and the supporter 12 is turned in more than one direction by the driving force transmitted from the drive unit 13. The drive unit 13 includes a motor and others, and it rotates the supporter 12 so that the seat 11 supporting the user changes in direction. In this way, the posture control unit 10 changes the direction of the body of the user sitting on the seat 11.

The term "body direction" used below denotes the direction in which the user's body faces in the real space. In other words, the body direction coincides with the direction in which the front of the user's trunk faces. Also, the term "absolute face direction" is used to denote the direction of the user's face in the real space. According to this embodiment, the user's neck and face are not completely fixed to the seat 11. Consequently, the user is able to change the direction of his face as he turns his head while he is sitting on the seat 11. In other words, there is no guaranty that the direction of the user's body coincides with the absolute face direction.

According to this embodiment, it is assumed that the drive unit 13 is able to turn the seat 11 on each of the three rotational axes mutually intersecting at right angles. To be specific, the drive unit 13 turns the seat 11 on each of the X axis, Y axis, and Z axis as depicted in FIG. 1. The Z axis is parallel to the direction of gravity, and the Y and Z axes are parallel to the horizontal plane. With rotations on three axes combined together, the drive unit 13 is able to control the user's body direction arbitrarily throughout the whole sky. The term "world coordinate system" is used below to denote the coordinate system that is represented by the three rotational axes established in the real space. By contrast, the term "local coordinate system" is used to denote the coordinate system which turns together with the seat 11 which is moved by the drive unit 13.

The encoder 14 measures how much the seat 11 is turned by the drive unit 13, and it also outputs the result of measurement. The information processing apparatus 40 mentioned later references the output from the encoder 14 so as to specify the direction of the seat 11 or the body direction of the user in the world coordinate system.

The display unit 20 is a head-mounted display or a smart glass, which is worn on the user's head. Moreover, the display unit 20 includes a display element 21, a motion sensor 22, and a light-emitting element 23.

The display element 21 displays the video received from the information processing apparatus 40. This video appears in front of the user's eyes. The display element 21 may be able to display different videos for the user's right and left eyes. This permits the user to view three-dimensional videos due to parallax.

The motion sensor 22 may be an acceleration sensor, gyroscope, magnetic field sensor, or the like. It measures how much the direction of the display unit 20 changes in the real space. Since the display unit 20 is fixed to the user's head while it is in use, its direction represents the absolute face direction in the world coordinate system. In other words, so long as the results of measurement by the motion sensor 22 represent the direction of the display unit 20 with sufficient accuracy, the information processing apparatus 40 is able to specify the absolute face direction simply by referencing the results of measurement by the motion sensor 22. Unfortunately, because of its inherent characteristic properties, the motion sensor 22 is incapable of accurately detecting the direction or is subject to the gradual accumulation of errors during operation. This leads to an instance in which it is difficult for the motion sensor 22 to accurately specify the absolute face direction when it is used alone.

This embodiment copes with this situation in such a way that the direction of the display unit 20 is specified by combining the result of detection by the motion sensor 22 with the result of measurement of the direction of the display unit 20 which is obtained by observation from the outside of the display unit 20. To be specific, there are arranged a plurality of light-emitting elements 23 in front of the display unit 20 which emit light in response to the instruction from the information processing apparatus 40, and the thus emitted light is photographed by the camera 30, so that it is made possible to specify the change in the direction of the display unit 20.

The foregoing arrangement according to this embodiment, however, has a disadvantage as follows due to the fact that the seat 11 in itself turns in various directions. Any attempt to install the camera 30 on the outside of the posture control apparatus 10 so as to make the camera 30 image the display unit 20 fails because the camera 30 hides itself behind the seat 11 and the supporter 12. This situation is evaded in this embodiment by mounting the camera 30 on the posture control system 10. To be more specific, the camera 30 is fixed to the supporter 12 which rotates together with the seat 11, so that it invariably stays in front of the user sitting in the seat 11, as depicted in FIG. 1. The result of this arrangement is that the shooting direction of the camera 30 remains unchanged relative to the seat 11, but the shooting direction of the camera 30 in the real space changes as the seat 11 turns. In other words, the camera 30 invariably keeps its position and shooting direction stable in the local coordinate system. Moreover, the camera 30 covers the vicinity of the head of the user sitting in the seat 11 even though the seat 11 turns in any direction. The light of the light-emitting elements 23 photographed by the camera 30 disposed in the display unit 20; therefore, the information processing apparatus 40 analyses the position of light spots so as to specify the change in direction of the display unit 20 relative to the camera 30. The camera 30 transmits in real time the photographed video to the information processing apparatus 40.

The information processing apparatus 40 is a desktop game machine, personal computer, or the like, and it includes a control unit 41, a memory unit 42, and an interface unit 43, as depicted in FIG. 2. Incidentally, the information processing apparatus 40 may be placed at any position away from or inside the posture control unit 10. It is possible to make connection by a communication cable between the information processing apparatus 40 and the display unit 20 if the information processing apparatus 40 is installed inside the posture control unit 10.

The control unit 41 contains at least one processor, so that it executes a various kinds of information processing in response to the program stored in the memory unit 42. What the control unit 41 executes will be described later in more detail. The memory unit 42 contains at least one memory device such as random access memory (RAM), which stores the program to be executed by the control unit 41 and the data to be processed by the program.

The interface unit 43 has wireless or wired communication with the posture control unit 10, the display unit 20, and the camera 30, for data transmission and reception between them. In concrete terms, the interface unit 43 dispatches a control instruction to the posture control unit 10, thereby activating the drive unit 13 and acquiring the results of measurement by the encoder 14. It also provides the display unit 20 with the video signals for display by the display elements 21. It also acquires from the display unit 20 the result of measurement by the motion sensor 22. It also receives the image taken by the camera 30.

Figure 3:
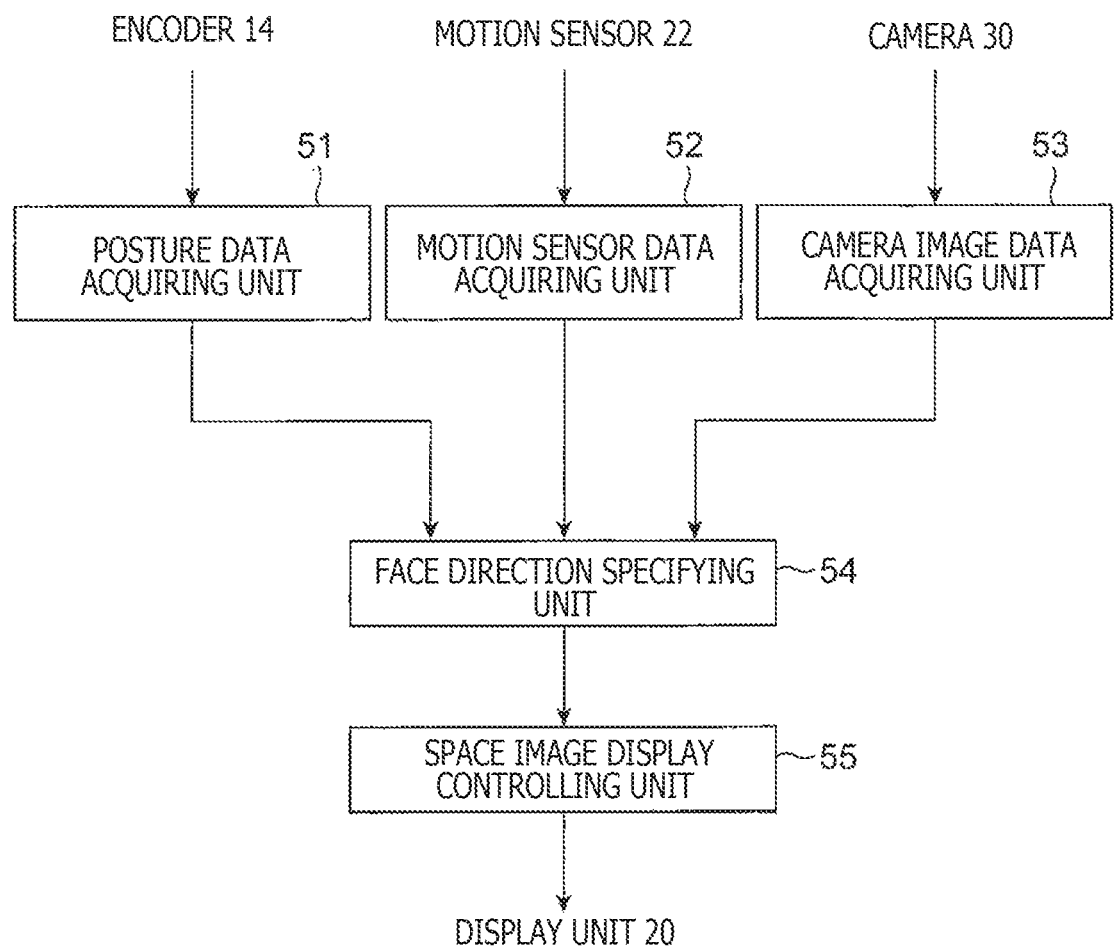
FIG. 3 is a block diagram depicting a function of an information processing apparatus pertaining to the embodiment of the present disclosure.

Function implemented by the information processing apparatus 40 will be described below with reference to the block diagram depicted in FIG. 3. It is to be noted from FIG. 3 that the information processing apparatus 40 functionally includes a posture data acquiring unit 51, a motion sensor data acquiring unit 52, a camera image data acquiring unit 53, a face direction specifying unit 54, and a space image display controlling unit 55. These units realize their functions as the control unit 41 executes the program stored in the memory unit 42. This program may be supplied to the information processing apparatus 40 through communication networks such as the Internet or supplied in the form of data stored in a computer-readable information memory medium such as optical disc.

The posture data acquiring unit 51 periodically acquires the result of measurement by the encoder 14 and uses it to specify the direction of the seat 11 in the real space. Incidentally, the term "posture data" is used below to denote the data representing the direction of the seat 11 which has been specified according to the result of measuring by the encoder 14. The posture data represents the direction of the user's body. The posture data is based on the directional vectors in the world coordinate system.

The motion sensor data acquiring unit 52 periodically acquires the result of measurement by the motion sensor 22 in the display unit 20. Using the result of measurement, it specifies the direction of the display unit 20 in the real space at the time of measurement. In what follows, the term "motion sensor data" is used to denote the data representing the direction of the display unit 20 which has been specified on the basis of the result of measurement by the motion sensor 22. Like the posture data, the motion sensor data may be represented in terms of the directional vectors in the world coordinate system. The motion sensor data is expected to represent the absolute direction of the user's face. The absolute face direction may possibly deviate from the actual one on account of the accuracy of measurement by the motion sensor 22.

The camera image data acquiring unit 53 periodically acquires the images taken by the camera 30 and examines them for the position and size of light in the light-emitting elements 23 for the camera image, thereby specifying the direction of the display unit 20 as viewed from the shooting position of the camera 30. In what follows, the term "camera image data" is used to denote the data representing the direction of the display unit 20 which has been specified on the basis of the camera image. The camera image data represents the direction of the user's face according to the direction of the seat 11 (or the direction of the user's body) because the camera 30 changes its shooting direction as the seat 11 moves, as mentioned above. In other words, the camera image data represents the direction of the user's face in the local coordinate system but not in the world coordinate system. The camera image data is represented in terms of the directional vector in the local coordinate system. In addition, the term "relative face direction" is used below to denote the direction of the user's face in the local coordinate system.

The face direction specifying unit 54 accurately specifies the direction of the user's face on the basis of the posture data, motion sensor data, and camera image data. To be concrete, the face direction specifying unit 54 specifies either or both of the absolute face direction in the real space and the relative face direction with reference to the body direction.

In order to specify the absolute face direction, the face direction specifying unit 54 augments the body direction (represented by the posture data) with the direction (represented by the camera image data), thereby calculating the absolute face direction of the user. The augmentation denotes the computation to combine two directions in the same coordinate systems. This is accomplished by addition of two directional vectors if the two directions are represented by the directional vectors of the same magnitude. Since the camera image data represents the user's face direction with reference to the user's body direction, the augmentation of the body direction with the direction representing the camera image data makes it possible to calculate the user's absolute face direction. On the other hand, since it is assumed that the motion sensor data represents the user's absolute face direction, the face direction specifying unit 54 calibrates the direction represented by the motion sensor data by means of the absolute face direction calculated by the posture data and camera image data, thereby specifying the absolute face direction. In this way it is possible to accurately specify the absolute face direction by combining together the posture data, camera image data, and motion sensor data.

Moreover, in order to specify the relative face direction, the face direction specifying unit 54 subtracts the body direction represented by the posture data from the absolute face direction represented by the motion sensor data, thereby calculating the face direction (relative face direction) in the local coordinate system based on the body direction. The subtraction denotes the computation to obtain one direction with reference to the other direction in the same coordinate system. This is accomplished by subtraction of one direction from another direction in the case where the two directions are represented by the directional vectors of the same magnitude. Subsequently, the face direction specifying unit 54 calibrates the direction (represented by the camera image data) by using the relative face direction calculated from the motion sensor data and posture data so as to specify the relative face direction. In this way, the face direction specifying unit 54 can accurately specify the relative face direction by combining together the three kinds of data, as in the case of specifying the absolute face direction.

The space image display controlling unit 55 draws the space image (representing the state in the virtual space) by using the face direction specified by the face direction specifying unit 54, thereby allowing display unit 20 to display it. To be concrete, the space image display controlling unit 55 creates the virtual space in which are arranged the user and other objects and also performs processing to change the user's posture in the virtual space. Moreover, it provides the posture control unit 10 with control instructions to vary the user's posture in the real space as the user's posture varies in the virtual space.

In addition, the space image display controlling unit 55 determines the user's face direction in the virtual space on the basis of the face direction specified by the face direction specifying unit 54, thereby drawing the image of the state in the virtual space seen in the face direction. At this time, the space image display controlling unit 55 may draw two space images depicting the state in the virtual space seen from two viewpoints existing side by side. In this way it is possible for the display unit 20 to display the three-dimensional image depicting the state in the virtual space that can be recognized three-dimensionally. Incidentally, the space image display controlling unit 55 may also determine the face direction in the virtual space based on the absolute face direction specified by the face direction specifying unit 54 or determine the face direction based on the relative face direction specified by the face direction specifying unit 54 and the information of the user's posture in the virtual space.

The flow diagram of FIG. 4 illustrates how the information processing apparatus 40 mentioned in the foregoing embodiment performs its processing in a typical example.

First, the space image display controlling unit 55 determines how the user's posture should be changed and issues a control instruction for such a change to the posture control unit 10 (S1). In response to this instruction, the posture control unit 10 causes the drive unit 13 to start controlling the rotation of the seat 11.

Then, the posture data acquiring unit 51 calculates the posture data (indicating the direction of the user's body) with the help of the result of measurement by the encoder 14 (S2). In addition, the motion sensor data acquiring unit 52 calculates the motion sensor data (indicating the user's absolute face direction) with the help of the result of measurement by the motion sensor 22 (S3). Furthermore, the camera image data acquiring unit 53 calculates the camera image data (indicating the user's relative face direction) with the help of the photographed image of the camera 30 (S4).

Subsequently, the face direction specifying unit 54 calculates the user's absolute face direction with the help of the posture data obtained in S2 and the camera image data obtained in S4 (S5). The motion sensor data obtained in S3 with the help of the direction data calculated in S5 is calibrated so as to finally specify the user's absolute face direction (S6).

The space image display controlling unit 55 draws the space image depicting the state in the virtual space on the basis of the absolute face direction specified in S6 and outputs it to the display unit 20 (S7).

Subsequently, the space image display controlling unit 55 determines whether or not the space image display controlling unit 55 should change the user's posture (S8). If the answer in S8 is Yes (or the user's posture has changed from that which has been output in S1), the process returns to S1 in which a new control instruction is issued to change the posture. By contrast, if the answer in S8 is No (or the user's posture has been maintained), the step returns to S2 in which the space image in the next frame is drawn. As the result of repeating the foregoing steps, the posture control system is able to continuously present the user with the scene in the virtual space which the user would see when he moves his face to look around the virtual space while changing the posture in the virtual space. At the same time, the direction of the user's body also changes in the real space as the posture change in the virtual space, so that the user feels the change in gravity force, thereby enhancing the ambience of the virtual space.

As mentioned above, the information processing apparatus 40 according to the embodiment of the present disclosure is able to accurately specify the user's face direction as the result of combining together the posture data representing the user's body direction, the motion sensor data obtained by the motion sensor 22 of the display unit 20, and the camera image data representing the user's face direction photographed by the camera 30 that is linked with the seat 11.

Incidentally, the embodiment of the present disclosure is not restricted to that mentioned above. For example, although the foregoing is based on the assumption that the posture data is calculated from the result of measurement by the encoder 14 contained in the posture control unit 10, the posture data may be specified by any other method. That is, the information processing apparatus 40 may specify the posture which is expected when the control instruction is issued to activate the posture control unit 10. In addition, the result of detection by any other sensors than the encoder 14 may be used to specify the user's body direction.

The foregoing is also based on the assumption that the posture control unit 10 changes the direction of the user's body while the user is sitting on the seat 11. However, the posture control unit 10 may be variously modified so long as the user is fixed to a pedestal of any type but is free to change the direction of his body. For example, the posture control unit 10 may be one which is able to change the direction of the user's body lying on a stage. Moreover, although the foregoing is based on the assumption that the posture control unit 10 is capable of turning the seat 11 in any direction around three axes mutually crossing at right angles, it may be so modified as to turn around only one or two axes or around axes which do not cross at right angles. It may have the axes of rotation which turn in a limited range of angle.

The foregoing is also based on the assumption that the display unit 20 is provided with the light-emitting elements 23; however, this is not true so long as it is possible to specify the direction of the display unit 20 on the basis of the camera image taken by the camera 30. In this case, the display unit 20 may be provided on its surface with simply visible markers so that the information processing apparatus 40 specifies the direction of the display unit 20 based on the markers' position.

The foregoing is also based on the assumption that the camera 30 is attached to the posture control unit 10; however, the camera 30 may be attached to the display unit 20. In this case, too, the camera 30 changes in its shooting direction as the user's body changes in direction. For this purpose, the posture control unit 10 is provided with markers so that it is covered in the camera's shooting range. Such markers move in the real space as the posture control unit 10 controls the posture. The result is that unless the user wearing the display unit 20 changes his face direction, the markers seen from the camera 30 attached to the display unit 20 remain stationary at all times. Conversely, if the position of the markers in the camera image changes, it is assumed that such a change is due to the change in direction of the user's face. Thus, it is possible to calculate the change in direction of the user's face by analyzing the position of the markers in the camera image taken by the camera 30 attached to the display unit 20.

The foregoing is based on the assumption that the information processing apparatus 40 calculates the posture data, the motion sensor data, and the camera image data; however, this may be modified such that these items of data are calculated by any other apparatus and the results are supplied to the information processing apparatus 40.

The present disclosure contains subject matter related to that disclosed in Japanese Priority Patent Application JP 2017-210140 filed in the Japan Patent Office on Oct. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A posture control system containing a posture control unit that changes a direction of a user's body and a display unit to be mounted on a user's head, the posture control system comprising:
   a posture data acquiring unit configured to acquire posture data indicating the direction of the user's body which varies by the posture control unit;
   a motion sensor data acquiring unit configured to acquire motion sensor data indicating a direction of a user's face in a real space which is detected by a motion sensor built in the display unit;
   a camera image data acquiring unit configured to acquire camera image data indicating the face direction with reference to the direction of the user's body which is specified based on a camera image taken by a camera which changes in shooting direction as the direction of the user's body changes; and
   a face direction specifying unit configured to specify the direction of the user's face based on the posture data, the motion sensor data, and the camera image data.

2. The posture control system according to claim 1, wherein the camera is mounted on a position of the posture control unit at which the user's head can be photographed.

3. The posture control system according to claim 1, wherein the face direction specifying unit calculates the direction of the user's face in the real space based on the posture data and the camera image data and specifies based on results of the calculation and the motion sensor data, the direction of the user's face in the real space.

4. The posture control system according to claim 1, wherein the face direction specifying unit calculates the direction of the user's face with reference to the direction of the user's body based on the posture data and the motion sensor data and specifies the direction of the user's face with reference to the direction of the user's body based on results of the calculation and the camera image data.

5. The posture control system according to claim 1, further comprising:
   a display controlling unit configured to draw an image in a space which depicts states seen inside a virtual space in a direction corresponding to the direction of the user's face which has been specified by the face direction specifying unit, and allow the display unit to display the drawn image.

6. An information processing apparatus to be connected to a posture control unit that changes a direction of a user's body and to a display unit mounted on a user's head, the information processing apparatus comprising:
   a posture data acquiring unit configured to acquire posture data indicating the direction of the user's body which varies by the posture control unit;
   a motion sensor data acquiring unit configured to acquire motion sensor data indicating a direction of a user's face in a real space which is detected by a motion sensor built in the display unit;
   a camera image data acquiring unit configured to acquire camera image data indicating the face direction with reference to the direction of the user's body which is specified based on a camera image taken by a camera which changes in shooting direction as the direction of the user's body changes; and
   a face direction specifying unit configured to specify the direction of the user's face based on the posture data, the motion sensor data, and the camera image data.

7. An information processing method comprising:
   acquiring posture data indicating a direction of a user's body which varies by a posture control unit that changes the direction of the user's body;
   acquiring motion sensor data indicating a direction of a user's face in a real space which is detected by a motion sensor built in a display unit to be mounted on a user's head;
   acquiring camera image data indicating the face direction with reference to the direction of the user's body which is specified based on a camera image taken by a camera which changes in shooting direction as the direction of the user's body changes; and
   specifying the direction of the user's face based on the posture data, the motion sensor data, and the camera image data.

8. A non-transitory computer readable medium having stored thereon a program for a computer connected to a posture control unit to change a direction of a user's body and a display unit mounted on a user's head, the program comprising:
   by a posture data acquiring unit, acquiring posture data indicating the direction of the user's body which varies by the posture control unit;
   by a motion sensor data acquiring unit, acquiring motion sensor data indicating a direction of a user's face in a real space which is detected by a motion sensor built in the display unit;
   by a camera image data acquiring unit, acquiring camera image data indicating the face direction with reference to the direction of the user's body which is specified based on a camera image taken by a camera which changes in shooting direction as the direction of the user's body changes; and
   by a face direction specifying unit, specifying the direction of the user's face based on the posture data, the motion sensor data, and the camera image data.

* * * * *